United States Patent

Hammerslag et al.

[11] Patent Number: 5,158,042
[45] Date of Patent: Oct. 27, 1992

[54] KITTY LITTER DISPOSAL METHOD AND DEVICE

[75] Inventors: Charles M. Hammerslag, Farmingville; Joyce A. Moebes, West Babylon, both of N.Y.

[73] Assignee: C. M. Hammerslag Associates, Inc., Farmingville, N.Y.

[21] Appl. No.: 811,023

[22] Filed: Dec. 20, 1991

[51] Int. Cl.$^5$ .............................................. A01K 29/00
[52] U.S. Cl. .................................. 119/167; 119/165; 119/170
[58] Field of Search ............... 119/167, 166, 168, 169, 119/170; 383/117; 220/404, 407

[56] References Cited

U.S. PATENT DOCUMENTS

| | | | |
|---|---|---|---|
| 3,809,013 | 5/1974 | Rigney et al. | 119/167 |
| 4,308,925 | 1/1982 | Stepanian et al. | 119/167 |
| 4,505,226 | 3/1985 | Carlson | 119/166 |
| 4,615,300 | 10/1986 | McDonough | 119/167 |
| 4,723,510 | 2/1988 | Skillestad | 119/167 |
| 4,771,731 | 9/1988 | Derx et al. | 119/166 |
| 4,784,082 | 11/1988 | Wolfe | 119/167 |
| 4,870,924 | 10/1989 | Wolfe | 119/167 |

Primary Examiner—Gene Mancene
Assistant Examiner—Thomas Price
Attorney, Agent, or Firm—Daniel Jay Tick

[57] ABSTRACT

A kitty litter disposal device for hygienically reusing kitty litter in a litter box has a plurality of fine-meshed nets in juxtaposition with the bottom of the litter box in the box. Each net covers the bottom of the litter box and extends along the inside surfaces of the sides of the litter box, over the lip of the litter box and along at least part of the outside surfaces of the sides. Net fasteners in the nets and on selected sides of the litter box releasably fasten the nets in position in the box, whereby kitty litter in the litter box on the nets is siftable via the uppermost of the nets upon unfastening of the uppermost of the nets and manual holding of same in the box at a distance above the remaining ones of the nets thereby to pass the kitty litter into the box.

18 Claims, 2 Drawing Sheets

KITTY LITTER DISPOSAL METHOD AND DEVICE

BACKGROUND OF THE INVENTION

The present invention relates to a method and device for kitty litter disposal. More particularly, the invention relates to a method and device for hygienically reusing kitty litter in a litter box.

Cleaning a kitty litter box can be an odious task if the solid matter in the litter is removed by hand, since the litter should be explored in order to avoid overlooking any solid matter. On the other hand, if the box were to be cleaned and the task were to be avoided, the entire contents of the box, including the litter, would be discarded. This would be wasteful and expensive.

The principal object of the invention is to provide a method of kitty litter disposal which hygienically reuses kitty litter, any treated litter sand, or the like, in a litter box.

An object of the invention is to provide a kitty litter disposal method which is readily and rapidly undertaken.

Another object of the invention is to provide a kitty litter disposal method which is simple in execution.

Still another object of the invention is to provide a method of kitty litter disposal which is accomplished with facility and convenience and a minimum of disruption to the kitty and the overseer of the box.

Yet another object of the invention is to provide a device for kitty litter disposal which insures hygienic reuse of kitty litter in a litter box.

Another object of the invention is to provide a kitty litter disposal device of simple structure which is inexpensive in manufacture.

Still another object of the invention is to provide a kitty litter disposal device which is effective, efficient and reliable in operation.

Yet another object of the invention is to provide a kitty litter disposal device which is economical in operation and result.

Another object of the invention is to provide a kitty litter disposal method which is economical in operation and result.

BRIEF SUMMARY OF THE INVENTION

In accordance with the invention, a kitty litter disposal device for hygienically reusing kitty litter in a litter box having a bottom and a plurality of sides, each of the sides having an inside surface in the litter box and an outside surface outside the litter box, the inside and outside surfaces joining to form a lip defining the opening of the box, comprises a plurality of fine-meshed nets in juxtaposition with the bottom of the litter box in the box. Each net covers the bottom of the litter box and extends along the inside surfaces of the sides of the litter box, over the lip of the litter box and along at least part of the outside surfaces of the sides.

A solid sheet of flexible material may be provided between the lowermost of the nets and the litter box.

Net fastening means may be provided in the nets and on selected sides of the litter box for releasably fastening the nets in position in the box, whereby kitty litter in the litter box on the nets is siftable via the uppermost of the nets upon unfstening of the uppermost of the nets and manual holding of same in the box at a distance above the remaining ones of the nets thereby to pass the kitty litter into the box.

The kitty litter is passed onto the remaining ones of the nets while the net held above the remaining ones of the nets retains solid matter from the litter.

The net fastening means comprises grommets in each of the nets and net pins extending from spaced opposite sides of the box on the outside surfaces thereof for accommodating the grommets.

Two of the grommets of the net fastening means are provided in spaced relation adjacent spaced opposite edges of each of the nets and two of the net pins of the net fastening means extend in spaced relation to each other from each of the spaced opposite sides of the box.

Each of a plurality of sheets of rigid material is positioned under a corresponding one of the nets and covers the bottom of the litter box. A plurality of sheet fastening means on the sheets and on selected sides of the litter box releasably fasten the sheets in position and enable removal of the sheets individually without user penetration of the box, whereby kitty litter in the litter box on the nets and sheets is siftable via the uppermost of the nets upon unfastening of the uppermost of the nets and manual holding is same in the box at a distance above the remaining ones of the nets and the sheets thereby to pass the kitty litter onto the uppermost of the sheets while the net held above the uppermost of the sheets retains solid matter from the litter and the litter is removable after sifting, if desired, by manual removal of the uppermost of the sheets.

The sheets may comprise disposable rigid material.

The sheet fastening means comprises lengths of cord-like material affixed to each of the sheets and tie pins extending from spaced opposite sides of the box on the outside surfaces thereof for accommodating the lengths of cord-like material.

Two of the lengths of cord-like material of the sheet fastening means are provided in spaced relation adjacent spaced opposite edges of each of the sheets and two of the tie pins of the sheet fastening means extend in spaced relation to each other from each of the spaced opposite sides of the box.

In accordance with the invention, a method of disposing of kitty litter which permits hygienic reuse of kitty litter in a litter box having a bottom and a plurality of sides, each of the sides having an inside surface in the litter box and an outside surface outside the litter box, the inside and outside surfaces joining to form a lip defining the opening of the box, comprises the steps of placing a plurality of fine-meshed nets in juxtaposition with the bottom of the litter box in the box, each covering the bottom of the litter box and extending along the inside surfaces of the sides of the litter box, over the lip of the litter box and along at least part of the outside surfaces of the sides.

A solid sheet of flexible material may be provided between the lowermost of the nets and the litter box.

The nets may be releasably fastened in position in the box, whereby kitty litter in the litter box on the nets is siftable via the uppermost of the nets upon unfastening of the uppermost of the nets and manually holding of same in the box at a distance above the remaining ones of the nets thereby to pass the kitty litter into the box.

The kitty litter is passed onto the remaining ones of the nets while the net held above the remaining ones of the nets retains solid matter from the litter.

The method comprises the further steps of placing each of a plurality of sheets of rigid material under a corresponding one of the nets and covering the bottom of the litter box and releasably fastening the sheets in position thereby enabling removal of the sheets individually without user penetration of the box, whereby kitty litter in the litter box on the nets and sheets is siftable via the uppermost of the nets upon unfastening of the uppermost of the nets and manual holding of same in the box at a distance above the remaining ones of the nets and the sheets thereby to pass the kitty litter onto the uppermost of the sheets while the net held above the uppermost of the sheets retains solid matter from the litter and the litter is removable after sifting, if desired, by manual removal of the uppermost of the sheets.

BRIEF DESCRIPTION OF THE DRAWINGS

In order that the invention may be readily carried into effect, it will now be described with reference to the accompanying drawings, wherein.

DETAILED DESCRIPTION OF PREFERRED EMBODIMENTS

Figure 5:
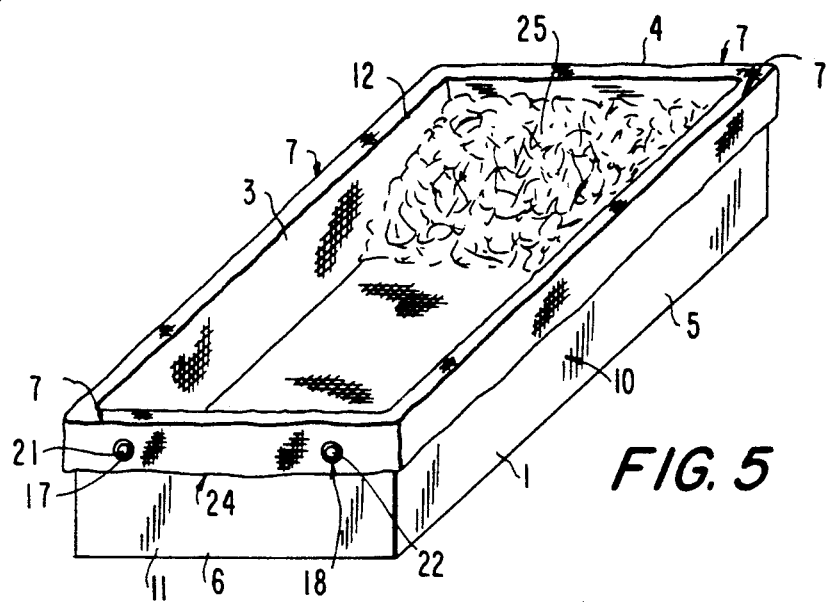
FIG. 5 is a perspective view, on an enlarged scale, of the second embodiment of the invention, illustrating the first step of the second embodiment of the method of the invention for the disposal of kitty litter.
Figure 6:
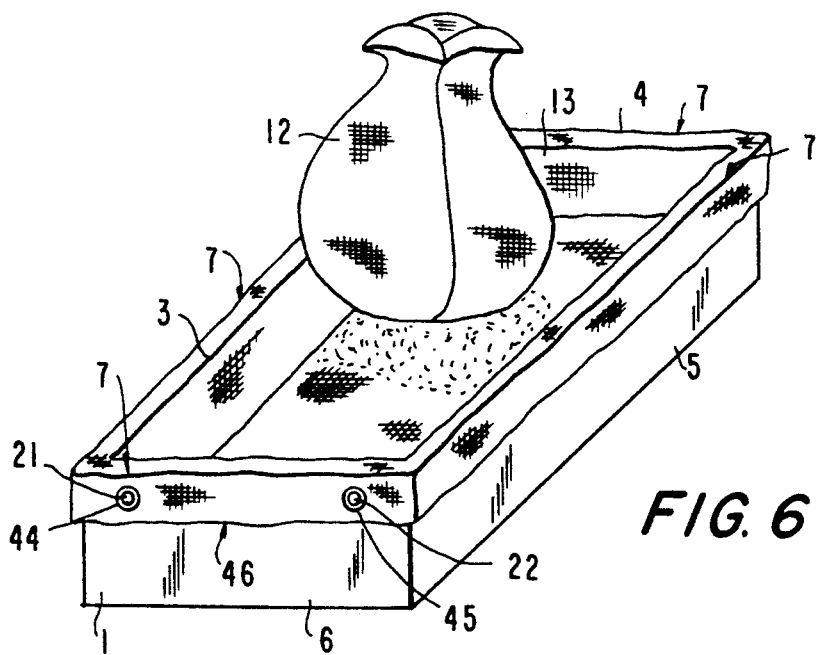
FIG. 6 is a perspective view, on an enlarged scale, of the second embodiment of the invention, illustrating the second step of the second embodiment of the method of the invention for the disposal of kitty litter.

The kitty litter disposal device of the invention hygienically reuses kitty litter, any sand, treated litter sand, or the like, in a litter box 1 (FIGS. 1 to 3, 5 and 6) of any suitable known configuration and material such as, for example, plastic. The litter box 1 has a bottom 2 (FIGS. 1 and 2) and a plurality of sides 3, 4, 5 and 6 (FIGS. 5 and 6). Each of the sides 3, 4, 5 and 6 has an inside surface in the litter box 1 and an outside surface outside said litter box; the inside and outside surfaces joining to form a lip 7 defining the opening of said box, as shown in FIGS. 5 and 6.

Figure 1:
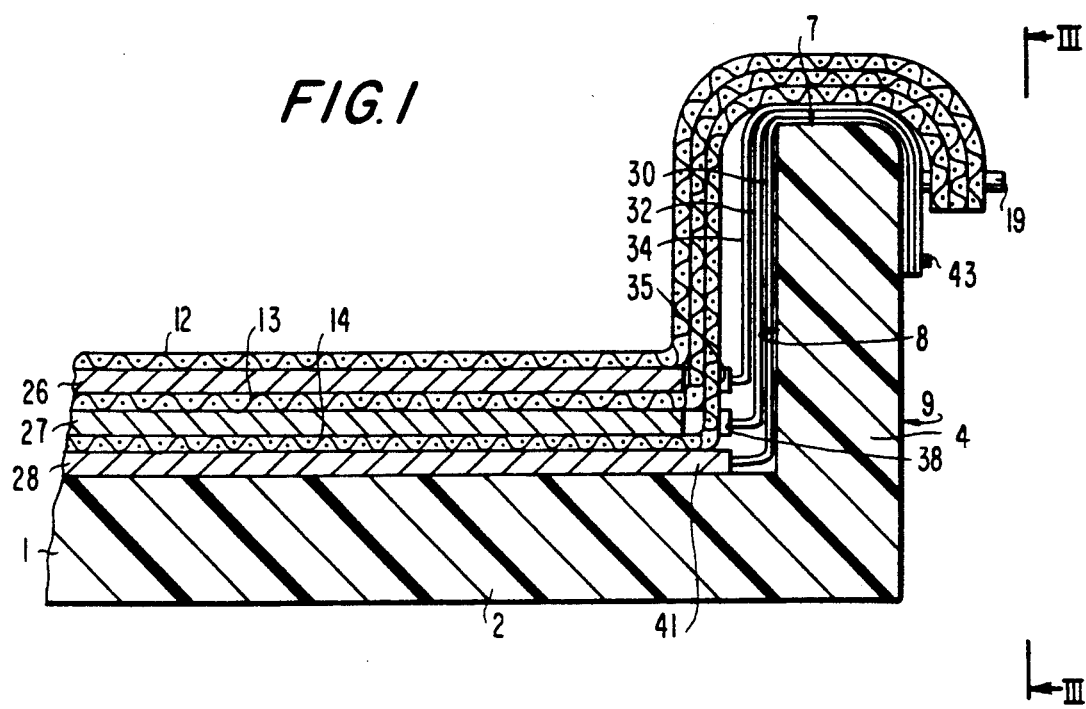
FIG. 1 is a cross-sectional view, on an enlarged scale, of a portion of a first embodiment of the kitty litter disposal device of the invention.

As shown in FIG. 1, the side 4 has an inside surface 8 and an outside surface 9. The outside surfaces 10 and 11 of the sides 5 and 6, respectively, of the litter box 1 are shown in FIGS. 5 and 6.

Figure 2:
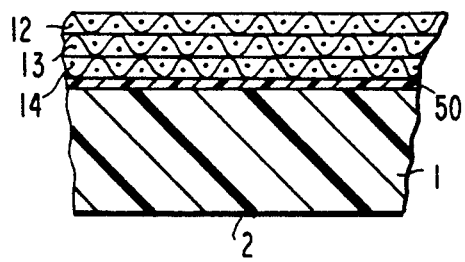
FIG. 2 is a cross-sectional view, on an enlarged scale, of a portion of a second embodiment of the kitty litter disposal device of the invention.

A plurality of fine-meshed nets or screens 12, 13 and 14 are positioned in juxaposition with the bottom 2 of the litter box in said box (FIGS. 1 and 2). Any suitable number of nets may be utilized although three are shown. The nets may comprise any suitable known nets or screens of any suitable known material and having suitable interstices or openings just sufficient to pass grains of kitty litter therethrough. As shown in FIGS. 5 and 6, each net covers the bottom 2 of the litter box 1 and extends along the inside surfaces of the sides of said litter box, over the lip 7 of said litter box and along at least part of the outside surfaces of said sides. A solid sheet of flexible material 50 (FIG. 2) of any suitable known type, such as, for example, plastic may be placed between the lowermost of the nets 12, 13 and 14 and any others and the litter box 1 to prevent any filtered litter from residing in said litter box.

Net fasteners may be provided in the nets 12, 13 and 14 and on selected sides of the litter box 1, such as, for example, the sides 4 and 6 (FIGS. 1, 3, 5 and 6), for releasably fastening said nets in position in said box. The net fasteners comprise grommets 15, 16, 17 and 18 in the net 12 and similar grommets in the other nets and pins 19, 20, 21 and 22 extending from spaced opposite sides 4 and 6 of the litter box 1 on the outside surfaces thereof for accommodating the grommets (FIGS. 1, 3, 5 and 6). Two of the grommets 15 and 16 of the net fastener are provided in spaced relation adjacent a first edge 23 of the net 12 (FIG. 3) and two of the grommets 17 and 18 of said net fastener are provided in spaced relation adjacent a spaced opposite second edge 24 of said net (FIG. 5). Two of the net pins 19 and 20 of the net fastener extend in spaced relation to each other from the side 4 of the litter box 1 (FIG. 3) and two of the net pins 21 and 22 of said net fastener extend in spaced relation to each other from the opposite side 6 of said litter box (FIG. 5).

Kitty litter 25 in the litter box 1 (FIG. 5) on the nets 12, 13 and 14 is siftable via the uppermost net 12 upon unfastening said uppermost net and manually holding the said net in said box at a distance above the remaining nets 13 and 14 and any other nets there may be, as shown in FIG. 6, thereby to pass said kitty litter into said box. In the second embodiment of the invention, shown in FIG. 2, the kitty litter 25 is passed via the sifting net or screen onto the remaining nets or screens 13 and 14 and any other nets or screens.

Figure 3:
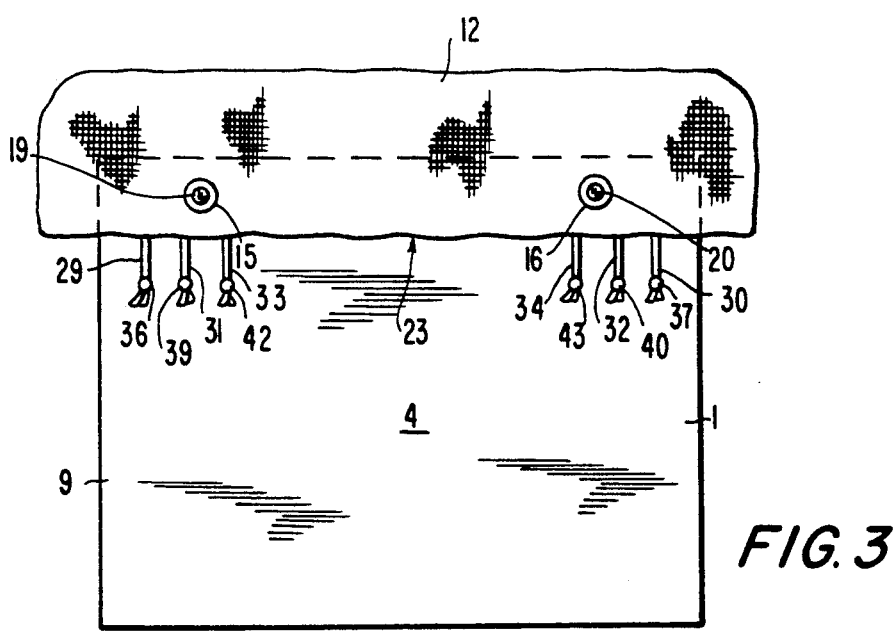
FIG. 3 is a view, taken along the lines III—III, of FIG. 1.
Figure 4:
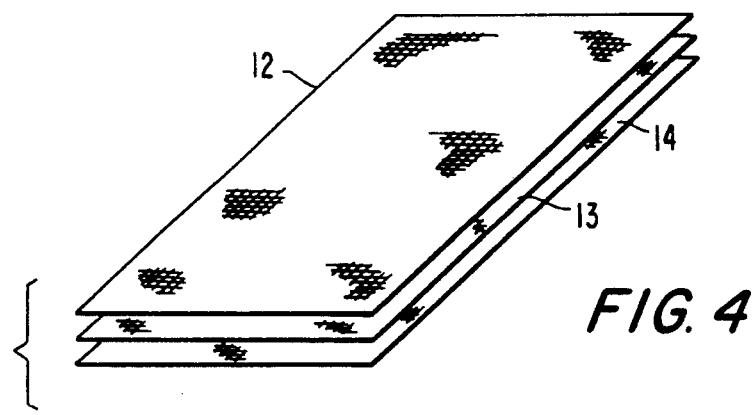
FIG. 4 is a perspective view, on an enlarged scale, of the nets of the first and second embodiments of the invention.

In the first embodiment of the invention, shown in FIGS. 1 and 3, a plurality of sheets 26, 27 and 28 and any additional number desired depending upon the number of nets 12, 13 and 14 utilized, of rigid material of any suitable type, such as, for example, corrugated board, cardboard, plywood, or the like, are provided. Each of the sheets 26, 27 and 28 and any other sheets is positioned under a corresponding one of the nets 12, 13 and 14, respectively, and any other nets, and covers the bottom 2 of the litter box (FIG. 1). The sheets 26, 27 and 28 may also be flexible material of any suitable known type, such as, for example, plastic material.

A plurality of sheet fasteners 29 to 34 are provided on the sheets 26, 27 and 28 and on selected sides of the litter box 1 for releasably fastening said sheets in position. The sheet fasteners 29 to 34 enable removal of the sheets 26, 27 and 28 and any other sheets individually without requiring that the user insert a hand into the litter box 1. The sheet fasteners comprise two lengths of cord-like material 29 and 30 (FIG. 3) of any suitable known material, such as, for example, cord, ribbon twine, wire, or the like, affixed in spaced relation to the sheet 26 adjacent a first edge 35 of said sheet (FIG. 1) and two lengths of such cord-like material (not shown in the FIGS.) affixed in spaced relation to the spaced opposite edge of said sheet (not shown in the FIGS.). Two tie pins 36 and 37 extend from the outside surface of the side 4 of the litter box 1 in spaced relation to each other (FIG. 3) for accommodating the lengths of material 29 to 34 or, more particularly, enabling said lengths of material to be releasably affixed, or tied, to said tie pins, as shown in FIG. 3. Two tie pins (not shown in the FIGS.) extend from the outside surface of the side 6 of the litter box 1 in spaced relation to each other for accommodating the two lengths of material of the sheet 26 not shown in the FIGS.

Two lengths of said cord-like material 31 and 32 are affixed in spaced relation to the sheet 27 adjacent a first edge 38 of said sheet (FIG. 1) and two lengths of said cord-like material (not shown in the FIGS.) are affixed in spaced relation to the spaced opposite edge of said sheet (not shown in the FIGS.). Two tie pins 39 and 40 extend from the outside surface of the side 4 of the litter box 1 in spaced relation to each other (FIG. 3) for accommodating the lengths of material 31 and 32. Two tie pins (not shown in the FIGS.) extend from the outside surface of the side 6 of the litter box 1 in spaced relation to each other for accommodating the two lengths of material of the sheet 27 not shown in the FIGS.

Two length of said cord-like material 33 and 34 are affixed in spaced relation to the sheet 28 adjacent a first edge 41 of said sheet (FIG. 1) and two lengths of said cord-like material (not shown in the FIGS.) are affixed in spaced relation to the spaced opposite edge of said sheet (not shown in the FIGS.). Two tie pins 42 and 43 extend from the outside surface of the side 4 of the litter box 1 in spaced relation to each other (FIG. 3) for accommodating the lengths of material 33 and 34. Two tie pins (not shown in the FIGS.) extend from the outside surface of the side 6 of the litter box 1 in spaced relation to each other for accommodating the two lengths of material of the sheet 28 not shown in the FIGS. If flexible material such as, for example, plastic, is utilized as the sheets 26, 27 and 28 and any other, the sheet fasteners may be dispensed with.

Kitty litter 25 in the litter box 1 (FIG. 5) on the nets 12, 13 and 14 and the sheets 26, 27 and 28 is siftable via the uppermost net 12 upon unfastening said uppermost net and manually holding the said net in said box at a distance above the remaining nets 13 and 14 and any other nets and the sheets 26, 27 and 28 and any other sheets there may be thereby to pass said kitty litter into said box onto the uppermost sheet 26 in the said box. The sifted and, therefore, cleaned litter, may thus either be discarded, if desired, by unfastening and removing the sheet 26, with the litter on it, from the litter box 1, or saved, by unfastening and removing said sheet and sliding said litter onto the net 13, which would then be the uppermost net. The sheet 26 may be discarded or salvaged for later use. The primary purpose of the sheets 26, 27 and 28 and any others is to function as buffers between the nets 12, 13 and 14 and any others and thereby preventing collection of sifted kitty litter at the bottom 2 of the litter box 1.

The method of the invention of disposal of kitty litter 25 permits hygienic reuse of the kitty litter in the litter box 1 by the following steps. First, the plurality of fine-meshed nets 12, 13 and 14 and any others are placed in juxtaposition with the bottom 2 of the litter box 1 in said box, with each net covering said bottom of said litter box and extending along the inside surfaces of the sides 3, 4, 5 and 6 of said litter box, over the lip 7 of said litter box and along at least part of the outside surfaces of said sides (FIGS. 1, 3, 5 and 6).

Second, a solid sheet of flexible material may be placed between the lowermost of the nets 12, 13 and 14 and any others and the litter box.

Thirdly, the nets 12, 13 and 14 and any others may be releasably fastened in position in the litter box 1 via the net fasteners 15 and 16 and 19 and 20 respectively, and 17 and 18 and 21 and 22, respectively.

Fourth, in the first embodiment of the method, the kitty litter 25 in the litter box 1 on the net 12 is sifted via said net upon unfastening of the said net and upon manually holding the said net in said box at a distance above the remaining nets 13 and 14 and any others and the sheets 26, 27 and 28 and any others thereby passing said kitty litter into the said box.

Fifth, the sifted litter is passed onto the sheet 26 in the litter box 1 while the net 12 manually held above said sheet and the remaining nets and other sheets by the user retains solid matter which is too large to pass through the interstices of said net, which matter is therefore to be discarded or disposed of as garbage or sewage.

Sixth, the cleaned, sifted litter may be used again by manually removing the sheet 26 from the box 1 and dumping said litter onto the then uppermost net 13. If the cleaned litter is not to be used again, the sheet 26 is manually removed from the box 1 and said litter alone, or with said sheet, is disposed of.

In the second embodiment of the method, in the fourth step, the kitty litter 25 is sifted via the net 12 over the nets 13 and 14 and any others in the litter box 1; the sheets are not utilized. The fifth and sixth steps are combined, since the sifted litter is passed onto the bottom 2 of the litter box 1 while the net 12 manually held above the nets 13 and 14 and any others by the user retains the undesired solid matter. The thoroughly sifted, cleaned litter, after passing through all the nets 13 and 14 and any others may be used again by permitting it to lie on the uppermost of said nets or upon the solid sheet of flexible material 50 (FIG. 1), if such sheet is used. Each time it is desired to clean the litter box 1, the user need merely remove or unfasten and remove the uppermost net from said box and utilize it in the aforedescribed manner to remove undesired matter from the litter.

As shown in FIG. 6, two of the grommets 44 and 45 of the net fastener are provided in spaced relation adjacent an edge 46 of the net 13.

Although shown and described in what are believed to be the most practical and preferred embodiments, it is apparent that departures from the specific methods and designs described and shown will suggest themselves to those skilled in the art and may be made without departing from the spirit and scope of the invention. We, therefore, do not wish to restrict ourselves to the particular constructions described and illustrated, but desire to avail ourselves of all modifications that may fall within the scope of the appended claims.

We claim:

1. A kitty litter disposal device comprising a litter box having a bottom and a plurality of sides, each of said sides having an inside surface in said litter box and an outside surface outside said litter box, said inside and outside surfaces joining to form a lip defining the opening of said box;

a plurality of fine-meshed nets in juxtaposition with the bottom of said litter box, each covering said bottom of said litter box and extending along said inside surfaces of said sides of said litter box, over the lip of said litter box and along at least part of said outside surfaces of said sides; and a plurality of sheets of rigid material, each positioned under a corresponding one of said nets and covering said bottom of said litter box.

2. A kitty litter disposal device as claimed in claim 1, further comprising net fastening means in said nets and on selected outside surfaces of said litter box for releasably fastening said nets in position in said box, whereby kitty litter in said litter box on said nets is siftable via the uppermost of said nets upon unfastening of said uppermost of said nets and manual holding of same in said box at a distance above the remaining ones of said nets thereby to pass said kitty litter into said box.

3. A kitty litter disposal device as claimed in claim 2, wherein said kitty litter is passed onto said remaining ones of said nets while the net held above said remaining ones of said nets retains solid matter from said litter.

4. A kitty litter disposal device as claimed in claim 2, wherein said net fastening means extends from spaced opposite sides of said box on the outside surfaces thereof.

5. A kitty litter disposal device as claimed in claim 2, further comprising a plurality of sheet fastening means on said sheets and on selected sides of said litter box for releasably fastening said sheets in position and for enabling removal of said sheets individually without user penetration of said box, whereby kitty litter in said litter box on said nets and sheets is siftable via the uppermost of said nets upon unfastening of said uppermost of said nets and manual holding of same in said box at a distance above the remaining ones of said nets and said sheets thereby to pass said kitty litter onto the uppermost of said sheets while the net held above said uppermost of said sheets retains solid matter from said litter and said litter is removable after sifting, if desired, by manual removal of said uppermost of said sheets.

6. A kitty litter disposal device comprising
a litter box having a bottom and a plurality of sides, each of said sides having an inside surface in said litter box and an outside surface outside said litter box, said inside and outside surfaces joining to form a lip defining the opening of said box;
a plurality of fine-meshed nets in juxtaposition with the bottom of said litter box, each covering said bottom of said litter box and extending along said inside surfaces of said sides of said litter box, over the lip of said litter box and along at least part of said outside surfaces of said sides; and
net fastening means in said nets and on selected sides of said litter box for releasably fastening said nets in position in said box, whereby kitty litter in said litter box on said nets is siftable via the uppermost of said nets upon unfastening of said uppermost of said nets and manual holding of same in said box at a distance above the remaining ones of said nets thereby to pass said kitty litter into said box, said net fastening means comprising grommets in each of said nets and net pins extending from spaced opposite sides of said box on the outside surfaces thereof for accommodating said grommets.

7. A kitty litter disposal device as claimed in claim 6, wherein two of said grommets of said net fastening means are provided in spaced relation adjacent spaced opposite edges of each of said nets and two of said net pins of said net fastening means extend in spaced relation to each other from each of said spaced opposite sides of said box.

8. A kitty litter disposal device comprising
a litter box having a bottom and a plurality of sides, each of said sides having an inside surface in said litter box and an outside surface outside said litter box, said inside and outside surfaces joining to form a lip defining the opening of said box;
a plurality of fine-meshed nets in juxtaposition with the bottom of said litter box, each covering said bottom of said litter box and extending along said inside surfaces of said sides of said litter box, over the lip of said litter box and along at least part of said outside surfaces of said sides; and
a plurality of sheets of rigid material, each positioned under a corresponding one of said nets and covering said bottom of said litter box; and
a plurality of sheet fastening means on said sheets and on selected sides of said litter box for releasably fastening said sheets in position and for enabling removal of said sheets individually without user penetration of said box, whereby kitty litter in said litter box on said nets and sheets is siftable via the uppermost of said nets upon unfastening of said uppermost of said nets and manual holding of same in said box at a distance above the remaining ones of said nets and said sheets thereby to pass said kitty litter onto the uppermost of said sheets while the net held above said uppermost of said sheets retains solid matter from said litter and said litter is removable after sifting, if desired, by manual removal of said uppermost of said sheets.

9. A kitty litter disposal device as claimed in claim 8, wherein said sheets comprise disposable rigid material.

10. A kitty litter disposal device as claimed in claim 8, wherein said sheet fastening means comprises lengths of cord-like material affixed to each of said sheets and tie pins extending from spaced opposite sides of said box on the outside surfaces thereof for accommodating said lengths of cord-like material.

11. A kitty litter disposal device as claimed in claim 10, wherein two of said lengths of cord-like material of said sheet fastening means are provided in spaced relation adjacent spaced opposite edges of each of said sheets and two of said tie pins of said sheet fastening means extend in spaced relation to each other from each of said spaced opposite sides of said box.

12. A method of disposing of kitty litter, said method comprising the steps of
forming a litter box having a bottom and a plurality of sides, each of said sides having an inside surface in said litter box and an outside surface outside said litter box, said inside and outside surfaces joining to form a lip defining the opening of said box;
placing a plurality of fine-meshed nets in juxtaposition with the bottom of said litter box in said box, each covering said bottom of said litter box and extending along said inside surfaces of said sides of said litter box, over the lip of said litter box and along at least part of said outside surfaces of said sides; and
placing each of a plurality of sheets of rigid material under a corresponding one of said nets and covering said bottom of said litter box.

13. A method as claimed in claim 12, further comprising the steps of placing a solid sheet of flexible material between the lowermost of said nets and said litter box.

14. A method as claimed in claim 12, further comprising the step of releasably fastening said nets to selected outside surfaces of said litter box in order to position said nets in said box, whereby kitty litter in said litter box on said nets is siftable via the uppermost of said nets upon unfastening of said uppermost of said nets and manually holding same in said box at a distance above the remaining ones of said nets thereby to pass said kitty litter into said box.

15. A method as claimed in claim 14, wherein said kitty litter is passed onto said remaining ones of said nets while the net held above said remaining ones of said nets retains solid matter from said litter.

16. A method of disposing of kitty litter, said method comprising the steps of
forming a litter box having a bottom and a plurality of sides, each of said sides having an inside surface in said litter box and an outside surface outside said litter box, said inside and outside surfaces joining to form a lip defining the opening of said box;
placing a plurality of fine-meshed nets in juxtaposition with the bottom of said litter box in said box, each covering said bottom of said litter box and extending along said inside surfaces of said sides of said litter box, over the lip of said litter box and along at least part of said outside surfaces of said sides;
placing each of a plurality of sheets of rigid material under a corresponding one of said nets and covering said bottom of said litter box; and
releasably fastening said sheets in position thereby enabling removal of said sheets individually without user penetration of said box, whereby kitty litter in said litter box on said nets and sheets is siftable via the uppermost of said nets upon unfastening of said uppermost of said nets and manual holding of same in said box at a distance above the remaining ones of said nets and said sheets thereby to pass said kitty litter onto the uppermost of said sheets while the net held above said uppermost of said sheets retains solid matter from said litter and said litter is removable after sifting, if desired, by manual removal of said uppermost of said sheets.

17. A method as claimed in claim 16, further comprising the step of placing a solid sheet of flexible material between the lowermost of said nets and said litter box.

18. A method as claimed in claim 16, further comprising the step of releasably fastening said nets in position in said box, whereby kitty litter in said litter box on said nets is siftable via the uppermost of said nets upon unfastening of said uppermost of said nets and manually holding same in said box at a distance above the remaining ones of said nets thereby to pass said kitty litter into said box.

* * * * *